United States Patent [19]

Tresser

[11] 4,430,350
[45] Feb. 7, 1984

[54] COMPOSITE ICE CONFECTIONS AND PROCESSES FOR PREPARING THEM

[75] Inventor: David Tresser, Bedford, England

[73] Assignee: Thomas J. Lipton, Inc., Englewood Cliffs, N.J.

[21] Appl. No.: 376,633

[22] Filed: May 10, 1982

Related U.S. Application Data

[63] Continuation of Ser. No. 244,794, Mar. 17, 1981, abandoned.

[30] Foreign Application Priority Data

| Jul. 20, 1979 | [GB] | United Kingdom | 7925402 |
| Jul. 20, 1979 | [GB] | United Kingdom | 7925446 |
| Jul. 20, 1979 | [GB] | United Kingdom | 7925447 |

[51] Int. Cl.³ .................. A23G 9/04; A23G 9/24
[52] U.S. Cl. .................. 426/101; 426/103; 426/606; 426/607; 426/613; 426/304; 426/307
[58] Field of Search .......... 426/607, 613, 606, 304, 426/307, 101, 103

[56] References Cited

U.S. PATENT DOCUMENTS

| 3,099,564 | 7/1963 | Gooding | 426/603 |
| 3,307,953 | 3/1967 | Siebers | 426/613 |
| 3,333,968 | 8/1967 | Bell et al. | 426/313 |
| 3,790,608 | 2/1974 | Caverly et al. | 426/607 |
| 4,086,370 | 4/1978 | Olds et al. | 426/613 |
| 4,292,338 | 9/1981 | Ainger | 426/607 |

FOREIGN PATENT DOCUMENTS

| 623770 | 10/1962 | Belgium . | |
| 1374072 | 8/1964 | France . | |
| 1414086 | 9/1965 | France | 426/607 |
| 1459659 | 10/1966 | France | 426/607 |
| 1547899 | 10/1968 | France | 426/607 |
| 2121601 | 1/1972 | France | 426/607 |
| 2204361 | 10/1973 | France . | |
| 459733 | 5/1964 | Switzerland . | |
| 947672 | 1/1964 | United Kingdom | 426/95 |
| 978086 | 12/1964 | United Kingdom | 426/607 |
| 1102944 | 2/1965 | United Kingdom | 426/607 |
| 1017480 | 1/1966 | United Kingdom | 426/283 |
| 1316079 | 5/1973 | United Kingdom | 426/607 |
| 1488305 | 10/1977 | United Kingdom | 426/613 |

Primary Examiner—Jeanette M. Hunter
Attorney, Agent, or Firm—Brumbaugh, Graves, Donohue & Raymond

[57] ABSTRACT

A composite frozen confection comprising an ice confection in contact with a layer of fat-based confectionery, said confectionery being a suspension of sweetening and flavoring solids in an edible fat, wherein the edible fat includes a fat composition which is an interesterified mixture of about 75% to 90% of a lauric acid or oil and about 10% to 25% of a non-lauric oil having (a) solids content index (SCI) values (%) in each of the following ranges:
70–93 at −20° C.
65–93 at −10° C.
55–90 at 0° C.
15–40 at 20° C.
0–12 at 30° C. and,
0 at 35° C.;

(b) slip melting point in the range 23°–32° C., and
(c) a brittleness time of at least 45 seconds.

9 Claims, No Drawings

COMPOSITE ICE CONFECTIONS AND PROCESSES FOR PREPARING THEM

This is a continuation, of application Ser. No. 244,794, filed Mar. 17, 1981 now abandoned.

This invention relates to frozen confection products and to processes for preparing them: and in particular to coated ice confections having fat-based coatings (couverture) and to other composite ice confections incorporating fatty layers.

Ice confections with fat-based coatings are wellestablished products. One known coating is chocolate, based on cocoa-butter. Many other fats have been proposed and some used. One fat that has been used is coconut oil.

Fat-based coatings can display properties that are unsatisfactory to the consumer, the producer or both. Such properties include the tendency to break, flake, or rub off during production or cosumption and to soften too much in the hands.

Another important way in which fat-based coatings can be unsatisfactory is that they may give an unsuitable mouthfeel in the context of the product in which they are used. On the one hand, such coatings may yield a lingering, cloying mouth-feel, seeming to clog the teeth and oral surfaces, often also imparting bitterness to chocolate flavourings. On the other hand, coatings may fail to appear to contain appreciable chocolate flavouring or texture.

There are two main categories of chocolate coated products relevant to this invention: enrobed products and dipped products. Enrobed products are represented, for example, by choc-ice bars (enrobed ice cream bars). Ice cream bars are enrobed by passage through a curtain of molten coating material to cover the top and sides, and rollers are used to coat the undersides during passage through the enrober. An airblower generally removes surplus coating material. Enrobing has been conventionally practised with cocoa butter based coatings, sometimes including vegetable fat blends. No such vegetable fat blend coatings have given products with mouth-feel better than that imparted by coatings based on cocoa butter, a natural material which is expensive and subject to unstable supply and market conditions. On the other than these coatings have been undesirably brittle.

Dipped products are represented for example by many chocolate coated confections on sticks, produced by dipping a core of material to be coated into a bath of molten coating material. Chocolate flavoured coatings for dipped products have been based on cocoa butter and on coconut oil. Cocoa butter does not lend itself to satisfactory processing in this way: it is hard to obtain a thin uniform coated product. Coconut oil is in many ways a desirable material but, like cocoa butter, it produces an undesirably brittle coating, and again is subject to market and supply difficulties.

Another use of coatings based on fat compositions is in the coating of baked confectionery containers or wafers for ice confections. Fat coating of such baked articles is disclosed for example in GB 947,672 (Big Drum, Inc.). It has been found, however, that with the fat coatings in use there is a problem of loss of crispness in the baked product during storage for a reasonable time, due to water transfer from the adjacent ice confection.

According to the invention there is provided a composite frozen confection comprising ice confection in contact with a layer of fat-based confectionery composition comprising a suspension of sweetening and flavouring solids in an edible fat which comprises a fat composition having:

(a) solids content index (SCI) values (%) (as defined below) in each of the following ranges:
70-93 at $-20°$ C.;
65-93 at $-10°$ C.;
55-90 at $0°$ C.;
$<10$ at $20°$ C.;
0-12 at $30°$ C.;
0 at $35°$ C.;

(b) slip melting point in the range $23°$-$32°$ C.; and (c) a brittleness time (as defined below) of at least 45 seconds, (preferably at least 60 seconds, and even better at least 80 seconds).

Preferably the viscosities of the fats are such that in the standard preparation for testing coating viscosity defined below they give viscosities ($\eta_{100}$) at $36°$ C. of $\leq 2.5$ poise, preferably 1.5-2.0 poise, and viscosities ($\eta_{CA}$) of $\leq 2.0$ poise.

Preferably the fats also have SCI values in the following ranges (%):
80-93 at $-20°$ C.;
75-90 at $-10°$ C.;
70-90 at $0°$ C.;
20 at $20°$ C.;
0-2 at $30°$ C.;
0 at $35°$ C.;
preferred slip-melting points are in the range $25°$-$29°$ C.

We find that such fats give particularly good results in terms of manufacturing convenience and consumer acceptability owing to their lack of excessive brittleness. We find that they can be formulated into confectionery coating compositions of distinctly good flavour and mouthfeel on their consumption as part of a composite frozen confection.

Normally such fats show a change in solids content over the last $5°$ C. of their melting profile of at least 20% of their solids content at $-20°$ C. Their maximum rate of solids formation upon cooling is normally above 13-16% per minute, with the time taken to reach 50% solids normally less than 5-6 minutes. The maximum solids content achieved in 20 minutes is normally in the range 70-90%.

Preferably these fats according to the invention are made up be using interesterified mixtures of fats containing acyl groups derived from edible naturally-obtained oils or their equivalents. For example, we prefer to use interesterified blends of (a) lauric fats or oils and (b) non-lauric fats or oils with (a) preferably in major proportion, e.g. in the weight proportions (a) 75%-90% to (b) 25%-10%.

"Lauric fat or oil" means an edible oil or fat having lauric and/or myristic acids as substantial fatty acyl constituents, (e.g. constituting 40-50% or more of the acyl groups), with the remaining fatty acyl content containing very little unsaturation: examples are palm kernel oil (preferred), babassu oil, coquito oil, coconut oil (also preferred).

The term "non-lauric fat or oil" means an edible oil in which the principal fatty acyl content is not lauric acid, and for example in which there is a substantial amount of $C_{16}$ and/or $C_{18}$ unsaturated acyl groups, e.g. oleic, linoleic and/or linolenic acyl groups: the remaining bulk of the acyl groups is largely saturated, e.g. $C_{16}$ or $C_{18}$ acids). Examples of such non-lauric oils are cottonseed oil, peanut oil, soyabean oil, sesame oil, safflower oil and sunflower oil, and particularly rapeseed oil (e.g. low-erucic rapeseed oil) and soyabean oil, and also palm oil.

When rapeseed oil, e.g. low-erucic rapeseed oil, is used as the non-lauric oil its preferred proportions before interesterification are in the range 50-25-15% by weight, especially about 18% by weight.

A particularly desirable fat in this category comprises a randomly interesterified blend of palm kernel oil (PKO) and rapeseed oil (RSO), especially in or about the proportions PKO 82.5:RSO 17.5 by weight: the rapeseed oil is preferably selectively hardened to a slip melting point in a desired range, e.g. about 25°–32° C., e.g. 25°–27° C.

Of course it is understood that in such interesterified blends other sources of acyl groups can be substituted for those quoted and for one another if their proportions and types of acyl groups are sufficiently similar, without regard to their indentical triglyceride combination or isomeric analysis. As an example, palm oil can be substituted easily by lard in the interesterified mixtures calling for its use.

Another particularly preferred method of making up the fat according to the invention is to use an interesterified blend of palm kernel oil with rapeseed oil, in the proportions above 50% to below 50% respectivey.

When randomly interesterified blends of a lauric fat or oil and a non-lauric oil, e.g. in proportions of 55-85%, e.g. 60-70%, and 45-15%, e.g. 40-30%, respectively, are used, the non-lauric oil or blend may be hardened (preferably selectively) to achieve the desired slip melting point. (Mixtures containing palm oil are preferably not hardened because palm oil is already hard enough for most purposes.)

By selective hardening we mean exposure of the fat material to be treated to a catalyst which brings about isomerisation of the ethylenic bonds without substantial hydrogenation: considerable geometrical isomerisation (cis⟷trans) occurs. A suitable known catalyst for the purpose is a poisoned nickel catalyst (a fresh nickel catalyst gives much hydrogenation (unselective hardening) but little of the isomerisation required in selective hardening).

Preferably, because a desired slip melting-point in the product can be achieved more accurately, the interesterified fat is selectively hardened rather than the liquid oil or the blend.

Further Examples of suitable fats in this category given for illustration but without limitation are:

(a) an interesterified blend of palm kernel oil and lowerucic rapeseed oil (PKO 60:40 RSO): the rapeseed oil is preferably selectively hardened to a slip melting point in the required range, e.g. about 27° C.;

(b) an interesterified blend of coconut oil (CNO) and rapeseed oil (CNO 82.5:17.5 RSO): the rapeseed oil is preferably selectively hardened to a slip melting point in the required range, e.g. about 26° C.

Certain fats suitable for use according to the invention are triglyceride mixture comprising a major proportion of acyl groups derived from lauric fats or oils, or non-lauric fats or oils (optionally hydrogenated unselectively or else selectively hardened), and a minor proportion by number of acyl groups with substantially short chain lengths, e.g. up to $C_6$. Preferably all or nearly all the short chain acyl groups are present in mixed triglycerides containing both short and long chains. So, for example, when palm kernel oil is used as a component of the fat, either alone, or in blend with, or in interesterified mixture with another lauric fat or oil or a non-lauric fat or oil, the short chain acyl groups can be introduced by interesterification with for example glyceryl triacetate or glyceryl tributyrate or glyceryl trihexanoate, or they can be introduced by blending (and optional interesterification) with an acetylated long chain monoglyceride or diglyceride, or a long chain mono- or di-glyceride acylated with short chain acyl groups.

Preferably the short chain acyl groups form up to about 20% by number of the total acyl groups of the triglyceride mixture.

Where the short chain acyl groups are acetyl groups, they are preferably present at up to the equivalent of the number of acyl groups that would be provided by 5% by weight triacetin in tripalmitin or a mainly palmitic fat or oil, suitably up to 3% by weight, e.g. 2% by weight. Where the short chain acyl groups are butyryl or hexanoyl groups they are preferably present at up to the equivalent of the number of acyl groups that would be provided by 10% by weight glyceryl trihexanoate in tripalmitin or a mainly palmitic fat or oil, suitably up to 5% by weight.

Suitable examples of fats of this type, given for illustration and not limitation, are:

(a) an interesterified blend of 97% palm kernel oil and 3% triacetin (by weight), which can be selectively hardened to a slip melting point in the required range, e.g. about 25.5° C.

(b) an interesterified blend of 90% coconut oil and 10% butterfat. (From this last example it can be seen that a natural source, i.e. in this case butterfat, can be used for the short chain acyl groups, the proportion of the respective material chosen in dependence on its content of such acyl groups.)

The use of hardened lauric oils gives fats with higher slip melting point than when untreated lauric oils are used. When hardened lauric oils used, somewhat more short chains can be present than otherwise, since one effect of those is to lower the slip melting point.

Also usable are further fat compositions comprising triglycerides of which a major or minor portion of the acyl groups (by number) are short chain ($C \leq 6$) acyl groups and a major or minor portion of the acyl groups (by number) are long chain ($C \geq 12$) acyl groups.

In the embodiments described below, the short chain ($C \leq 6$) acyl groups form less than 2/3 (by number) of the total acyl groups of the triglycerides. The short and long chain acyl groups are substantially randomly distributed amongst the triglycerides of the fat composition. In the embodiments described below, this random distribution is achieved (a) by mixing of heterogeneous glycerides, i.e. those having dissimilar acyl groups at least at two of the substitution positions of each glyceryl moiety, and/or (b) by interesterification of a mixture of unlike glycerides.

One very suitable fat composition comprises a mixture of a lauric fat or oil or a non-lauric fat or oil, (optionally hydrogenated either selectively or unselectively to a desired slip melting point, and preferably present at 23-75% weight) with a short chain acylated (i.e. preferably diacetylated) long chain monoglyceride, preferably present at 75-25% by weight). The long chain acyl groups of the short chain acylated monoglyceride can be derived from any source: $C_{18}$ saturated (stearyl) groups can be used, or optionally shorter chains or unsaturated chains can be present. In particularly preferred embodiments, palm kernel oil and/or cottonseed oil, preferably at about 50% are blended with acetylated $C_{16}$ and/or $C_{18}$ monoglyceride, substantially saturated. A substantially equivalent embodiment can if desired be produced by interesterifying a mixture with corresponding acyl content differently distributed.

As a guide and without limitation that we prefer to use confectionery compositions containing from 30–70%, preferably 45–70% by weight fat, e.g. about 55–65%: the major proportion of the fat is one or more of the fats of the invention as described herein. Emulsifiers, e.g. lecithin may be present as desired, e.g. in minor proportions about 0.5–1%.

Suitably the fat can constitute e.g. 30–70% of the coating compositions, preferably about 50–70% (e.g. about 60%) where the compositions are to be applied by dipping.

Composite frozen confections according to the invention can comprise layers or zones of such coating compositions together with layers or zones of ice confection and optionally layers or zones of baked or crispy confection, e.g. wafer.

One example of a milk chocolate composition usable as a coating composition in the invention, given for illustration only, contains fat at 59.2% by weight, icing sugar at 25.7%, cocoa powder (10/12% fat) 12,9% skim milk powder 1.7%. The total fat content is 60.6%. Dark chocolate coatings can of course be made in analogous manner with omission of milk product.

Standard methods of refining and conching are applicable to these coating compositions: final particle sizes are desirably for example about 17–19 $\mu m$ (by micrometer screw gauge) or 14–16 $\mu m$ *(by Sheen gauge)*.

The compositions can be used to dip ice confection bars in standard apparatus at for example about 36° C. dipping temperature. However, it is certainly not excluded to use these compositions for application to ice confections by any other suitable method of choice, e.g. by enrobing. The compositions can also be used to coat wafer containers for subsequent filling with ice confections: e.g. cones.

The compositions described herein have been found of great advantage in ice confection coatings owing to their low brittleness, and their satisfactory mouthfeel and flavour characteristics.

The solids content index, brittleness time and viscosity referred to herein are measurements obtained as described below. The slip melting point is measured by standard procedures well known to those skilled in the field to which this invention relates.

In this specification the solids content index (SCI) refers to a measurement obtained by the following or an equivalent test method: a sample of fat is placed in a low-temperature measurement cell of a wide-line nmr spectrometer calibrated for measurements of sample quantity, such as the "Quantity Analyser" commercially available from Newport Instruments, Newport Pagnell, Buckinghamshire, England. The sample is held at a required temperature for 10 minutes and then the percent solid fat is obtained from the instrument indication. This result is an SCI (%) referred to the test temperature.

In this specification "the brittleness time" refers to a measurement obtained by the following or an equivalent test method in which what is estimated is the speed at which a confectionery coating composition (containing the fat to be tested) becomes brittle on being used to coat a frozen confectionery article. The fat composition to be tested is incorporated at 59.2% of a confectionery composition containing 25.7% icing sugar, 12.9% cocoa powder (of 10–12% fat content), 1.7% skim milk powder and 0.5% lecithin. The total fat content of the composition should be 60.6%. Any conventional formulation process can be used: desirably the composition is rendered to a final particle size of 17–19 $\mu m$ by micrometer screw gauge, with most particles of 14–16 $\mu m$ as measured by a Sheen gauge: by Coulter Counter (Trade Mark) measurement 75% of particles are desirably 22 $\mu m$. The confectionery composition prepared this way is melted at 36° C. for 20 minutes in a gently stirred jacketed vessel, and used to coat frozen ice confection (ice cream) blocks on sticks in the following way. The blocks are desirably of 30 g weight and 100% overrun, stored at −26° C., taken from the store and immersed 9 seconds in moulds surrounded by water at 30° C., so that their surface temperature rises to −5° C. and their interior temperature to −15° C.: the blocks are then immediately dipped into the molten coating composition (immersion for about ½ second), withdrawn, and small sections of the coated block repeatedly cut off with a relatively blunt implement at closely-spaced time intervals by any suitable method until the coating can be heard to give an audible crack on cutting. The purpose is to simulate the conditions under which such compositions and coatings are bitten during consumption, and a test consumer can be used if desired. The time elapsed between the coating immersion and the propensity of the coating to give an audible crack on cutting is taken as the "brittleness time" as referred to in this specification.

In this specification the viscosity measurements $\eta_3$, $\eta_{100}$ and $\eta_{CA}$ are measurements obtained by the following or equivalent test methods. Viscosity measurements can be made on fat compositions or on coating compositions made therefrom. Where a coating composition is characterised, the viscosity measurement is made on the composition itself. Where a fat composition is in question, the viscosity measurements are either made on and referred to the fat composition itself or made on and referred to a coating composition comprising 45% or 59.2% by weight of the fat. Normally, coating compositions of 45% fat are used as standard where the coating compositions are intended for use in enrobing ice confections, and compositions of 59.2% fat where they are intended for use by dipping processes.

The parameters $\eta_3$ and $\eta_{100}$ represent the apparent viscosity at the quoted temperature (e.g. 40° C.) at shear rates of respectively 3 sec$^{-1}$ and 100 sec$^{-1}$. The parameter $\eta_{CA}$ represents the Casson plastic viscosity. $\eta_{100}$ and $\eta_{CA}$ are measured, for example, using a Hooke Rotoäisko MVI (Trade Mark) viscometer with a rotating inner cylinder. The fat or coating compositions to be measured are desirably melted to a temperature 15° C. above the slip melting point and then equilibrated 15 minutes at the temperature of measurement. When measurements are performed on couverture compositions these are pre-sheared 15 minutes at the measuring temperature at about 40 sec$^{-1}$. For good order, apparent viscosity readings are taken through a range of machine shear rate settings in both ascending and descending senses, to determine the apparent viscosity at the specified shear rate via determination of the shear stress for a given machine setting.

The parameter $\eta_{CA}$ (Casson plastic viscosity) is determined (e.g. using a similar viscometer to that mentioned above), but according to the method of N. Casson (Rheology of Disperse Systems, Pergamon Press, London 1959).

The parameter $\eta_3$ is measured for example using a Deer Rheometer PDR81 (Trade Mark) having an inner rotating cylinder or bob lowered onto a temperature-jacketed outer stationary cylinder containing the sample compositions. The inner cylinder or bob is driven at a controlled shear stress and the shear rate induced is measured: the apparent viscosity at a 3 sec$^{-1}$ shear rate is determined from the results obtained at a succession of shear stresses.

The rate of crystallisation of a fat composition sample can conveniently be measured under conditions when the sample (at 32° C.) is placed in an nmr cell of the same wide-line nmr spectrometer at $-20$° C. as is used for the SCI measurement, and monitoring the signal level from the spectrometer at frequent intervals over about 20 minutes, intercalated with frequent temperature measurements using a temperature probe inserted whenever required into the sample cell, and removed to allow nmr measurement. The maximum rate of solids formation achieved is the steepest tangent to the curve of solids contant versus time obtained from these measurements, and is expressed in % solids per minute.

EXAMPLE 1

(i) Refined palm kernel oil and commercial food-grade triacetin were blended in the ratios of 97:3 respectively. A batch of the blend was interesterified in a vessel fitted with a powerful stirrer, $N_2$ inlet and temperature control, by heating to 110° C, under $N_2$, agitation and injection of 0.2% by weight sodium catalyst. A colour change indicated completion of the reaction; agitation was maintained for 30 minutes. The product was washed with 1% acetic acid solution, followed by water washing to remove catalyst and soap, then dried. Completion of interesterification was checked by GLC of the triglycerides.

The product was given a slight selective hardening over sulphur-poisoned nickel catalyst to a slip melting-point of 25.5° C. Postrefining was carried out by bleaching with 2% C300 bleaching earth at 110° C. under $N_2$ for 30 minutes. 1% of kieselguhr was added to the cooled product and the whole filtered. After deodorisation (180° C. under vacuum for 4 hours) and addition of 0.1% lecithin the product interesterified blend was made up into confectionery coating compositions, (ii) A couverture composition intended especially but not exclusively for the dip-coating of ice confections was made up with the following ingredients: fat blend prepared in Example 1(i) 59.3%; sugar 25.6%; cocoa powder (10/12% fat content) 12.9%; skimmed milk powder 1.7%, emulsifier 0.5%, optional flavour to taste.

Ice confection briquettes were coated in similar manner to that described in the description of the test for brittleness tiem given above. The resulting products were made with excellent processing and consumer characteristics and showed a brittleness time of about 75 seconds.

EXAMPLE 2

(i) Crude palm kernel oil (FFA=5.1%) and rapeseed oil (FFA=3.2%, erucic acid content 37.2) were neutralised separately with 4N NaOH, and 4 times as much water. The rapeseed oil was further boiled with soda ash and silicate. The oils were washed free of soap and dried. A blend of the refined oils in the proportions palm kernel oil 82.5% and rapeseed oil 17.5% was bleached with 1% Tonsil Standard FF bleaching compound 20 minutes at 105° C. under vacuum. The blend was filtered at 80° C. The filtered bleached product was interesterified continuously with 0.05% by weight sodium methoxide catalyst at 125° C. for 4 minutes and transferred to a neutraliser vessel partly filled with dilute phosphoric acid. After washing with 0.2N NaOH and water, and after drying, the product was filtered with a commercial filter aid. Two batches of the blend were selectively hardened at 180° C., 3 kg/cm$^2$ $H_2$ pressure, and under strong agitation, with sulphur poisoned nickel catalyst at 0.2% (Example 2(i)A) and 0.5% (Example 2(i)B) respectively. The respective slip melting points achieved after 120 and 150 minutes respective hardening times were 26.8° C. (Example 2(i)A) and 26.6° C. (Example 2(i)B). The hardened blends were neutralised, washed free of soap and dried; then they were bleached, filtered, and deodorised (200° C., 4 hours). After cooling to 60° C., 0.1% by weight fresh lecithin antioxidant was added.

(ii) Confectionery coatings were produced from each fat, using the following ingredients:

| Coating: | A | B | C |
| --- | --- | --- | --- |
| Sugar | 25.6% | 20.8% | 15.4% |
| Cocoa powder (12/12% fat) | 12.9% | — | — |
| Cocoa powder (20/22% fat) | — | 10.6% | 7.8% |
| Skim milk powder | 1.7% | — | — |
| Fat Ex. 2(i)A | — | 68.3% | 76.5% |
| Fat Ex. 2(i)B | 59.3% | — | — |
| Emulsifier | 0.5% | 0.3% | 0.3% |
| (Total fat) | (60.7%) | (70.5%) | (78.1%) |

Coatings A and B were used to dip-coat ice cream briquettes/lollipops at 20 strokes per minute on a machine operating at immersion time 0.7 seconds, coating bath temperature 36° C., ice cream temperature immediately before dipping (surface) $-15$° C., (interior) $-23$° C.

Coating C was used to dip-coat ice cream briquettes/lollipops at 140 strokes/minute using 1.5 seconds immersion time, coating bath temperature 29° C., ice cream surface temperature $-9$° C., interior temperature $-24$° C.

In all cases the ice bars weighed about 27 g with 110% overrun. Excellent non-brittle coatings were produced without defects in an extended trial run, while a standard coating based on coconut oil (59.3%) gave by comparison poor coverage, blobs, and caused smearing of some wrappers. Coatings A, B and C gave brittleness times of 64, 85 and 100 seconds by comparison with 32 seconds for the standard coconut oil-based coating. These brittleness times were not directly related to setting times: the fastest coating to set had in fact the longest brittleness time.

The invention is not limited to the use of the materials particularly mentioned above. Further particular examples of fat compositions falling within the general classes mentioned above, which are useful, are interesterified blends of palm kernel oil and cottonseed oil (15%:85%), selectively hardened to slip melting point 25°–29° C.; of palm kernel oil and low-erucic rapeseed oil (15%:85%), selectively hardened to slip melting point 26° C.; and of palm kernel oil and soya bean oil (15%:85%), selectively hardened to slip melting point 25°–29° C. In each case as in the other cases described above the non-lauric oil can in part or even wholly be substituted by alternative materials, e.g. other non-lauric oils, or tallow olein, or palm olein.

Useful compositions can also be made by using e.g. 55–85% of the lauric fat or oil, and e.g. 45–15%, of the non-lauric oil. For example, we have found that many such compositions made with 50–75% lauric fat or oil, e.g. palm kernel oil or coconut oil, and 50–25% non-lauric oil, e.g. palm oil, or rapeseed oil, e.g. low-erucic rapeseed oil, can be used. These can be based for example on 30–70%, e.g. 30–55%, e.g. about 45% of the fat, together with sweetening and flavouring agents such as sugar and cocoa powder and optionally milk solids, to give a suspension in the fat of such solid agents. It is understood that such additional ingredients may include further and maybe different fat.

Many further examples of useful compositions according to the invention can have a major proportion, e.g. up to 85%, or below 90%, of the non-lauric fat or oil in the interesterified blend.

These fat compositions can, for example, be particularly useful in making coatings to be applied to ice confections by dipping.

Further Examples of suitable fats in this category given for illustration but without limitation are:
(a) an interesterified blend of palm kernel oil and low-erucic rapeseed oil (PKO 60:40 RSO): the rapeseed oil is preferably selectively hardened to a slip melting point in a desired range, e.g. about 27° C.;
(b) an interesterified blend of coconut oil (CNO) and rapeseed oil (CNO 82.5:17.5 RSO): the rapeseed oil is preferably selectively hardened to a slip melting point in a desired range, e.g. about 26° C.

EXAMPLES 3 and 4

(A) Preparation of fat compositions

Crude low-erucic rapeseed oil was neutralised with 0.8N NaOH. After a water wash, the oil was boiled with 1.5% its weight of 6N soda ash and 1% by weight of a sodium silicate solution for 30 minutes at 105° C., then washed free of soap and dried. Bleaching was carried out with 1% Tonsil Standard FF (Trade Mark) bleaching compound 20 minutes at 105° C. under vacuum. The neutralised bleached oil was deodorised 30 minutes at 180° C.

The rapeseed oil so treated was blended with fully-refined palm kernel oil in the weight ratio 40 rapeseed oil to 60 palm kernel oil in a first case (Example 2) and 50 to 50 in a second case (Example 3). Batches of the blends were interesterified continuously with 0.05% by weight sodium catalyst at 125° C. for 4 minutes. The product oil was then added to a vessel partly filled with diluted phosphoric acid (to neutralise excess sodium). The treated product oil (interesterified blends) were washed with 0.2N NaOH and water; when free of soap the blends were dried and filtered over 0.2% Hyflow (Trade Mark) filter aid.

Batches of the blends were selectively hardened under agitation in an autoclave fitted with six-blade turbine stirrer and four baffles. Hydrogen was blown into the headspace of the autoclave. Hardining was carried out at 180° C. with 0.5% by weight of sulphur-poisoned nickel catalyst at 3–5 kg/cm$^2$ H$_2$ pressure. The blends were hardened to slip melting-points of 26.8° C., (Example 2) and 26.7° C. (Example 3). The selectively hardened interesterified blends were neutralised, freed of soap, dried, bleached and deodorised in a similar manner as before. At 60° C., 0.1% fresh lecithin was added to each as antioxidant.

The properties of the fats prepared as described above were found to conform desirably with those described in the above specification as those of the invention.

(B) Preparation of confectionery coating compositions and ice confections

Using normal refining and conching procedures, the fat compositions prepared according to the invention in Examples 2(A) and 3(A) were made up into confectionery coating compositions containing 43.6% of the respective fat, 39.9% sugar, 16% cocoa powder (10/12% fat) and 0.5% lecithin, with optional flavourant to taste. These compositions were found to have highly desirable physical properties when used to coat ice confections (e.g. using an ice-briquette enrober and 40° C. coating temperature) and the flavour and mouthfeel characteristics of the products were found to compare satisfactorily with those of products based on 20% cocoa-butter fat.

EXAMPLE 5

(i) Crude palm kernel oil (FFA=5.1%) and rapeseed oil (FFA=3.2%, erucic acid content 37.2) were neutralised separately with 4N NaOH, and 4 times as much water. The rapeseed oil was further boiled with soda ash and silicate. The oils were washed free of soap and dried. A blend of the refined oils in the proportions palm kernel oil 82.5% and rapeseed oil 17.5% was bleached with 1% Tonsil Standard FF bleaching compound 20 minutes at 105° C. under vacuum. The blend was filtered at 80° C. The filtered bleached product was interesterified continuously with 0.05% by weight sodium methoxide catalyst at 125° C. for 4 minutes and transferred to a neutraliser vessel partly filled with dilute phosphoric acid. After washing with 0.2N NaOH and water, and after drying, the product was filtered with a commercial filter aid. Two batches of the blend were selectively hardened at 180° C., 3 kg/cm$^2$ H$_2$ pressure, and under strong agitation, with sulphur poisoned nickel catalyst at 0.2% (Example 5(i)A) and 0.5% (Example 5(i)B) respectively. The respective slip melting points achieved after 120 and 150 minutes respective hardening times were 26.8° C. (Example 5(i)A) and 26.6° C. (Example 5(i)B). The hardened blends were neutralised, washed free of soup and dried; then they were bleached, filtered, and doedorised (200° C., 4 hours). After cooling to 60° C., 0.1% by weight fresh lecithin antioxidant was added.

(ii) Confectionery coatings were produced from each fat, using the following ingredients:

| Coating: | A | B | C |
|---|---|---|---|
| Sugar | 25.6% | 20.8% | 15.4% |
| Cocoa powder (12/12% fat) | 12.9% | — | — |
| Cocoa powder (20/22% fat) | — | 10.6% | 7.8% |
| Skim milk powder | 1.7% | — | — |
| Fat Ex. 2(i)A | — | 68.3% | 76.5% |
| Fat Ex. 2(i)B | 59.3% | — | — |
| Emulsifier | 0.5% | 0.3% | 0.3% |
| (Total fat) | (60.7%) | (70.5%) | (78.1%) |

Coatings A and B were used to dip-coat ice cream briquettes/lollipops at 20 strokes per minute on a machine operating at immersion time 0.7 seconds, coating bath temperature 36° C., ice cream temperature immediately before dipping (surface) −15° C., (interior) −23° C.

Coating C was used to dip-coat ice cream briquettes/lollipops at 140 strokes/minute using 1.5 seconds immersion time, coating bath temperature 29° C., ice cream surface temperature −9° C., interior temperature −24° C.

In all cases the ice bars weighed about 27 g with 110% overrun. Excellent non-brittle coatings were produced without defects in an extended trial run, while a standard coating based on coconut oil (59.3%) gave by comparison poor coverage, blobs, and caused smearing of some wrappers. Coatings A, B and C gave brittleness times of 64, 85 and 100 seconds by comparison with 32 seconds for the standard coconut oil-based coating. These brittleness times were not directly related to setting times: the fastest coating to set had in fact the longest brittleness time.

EXAMPLE 6

A fat composition was prepared by blending (in conventional manner) refined palm kernel oil (50% by weight) and a commercially obtainable diacetylated long-chain saturated monoglyceride ($C_{16}$ and/or $C_{18}$) of slip melting point about 44° C. (50% by weight).

This fat composition was used in accordance with the invention to make a dark chocolate-flavoured confectionery coating composition containing 50% of the fat composition; 36.5% sugar (sucrose); 13% cocoa powder (10/12% fat content); and the balance a minor amount of flavourant and emulsifier.

The above-described embodiments and other of the compositions of the invention can be modified in a number of ways. For example, without limitation, the long-chain acyl groups may be derived partly or wholly from fatty compositions which have been made subject to interesterification or other processing, as well as from natural or refined fats and oils. For example, good results have been obtained when the palm kernel oil or cottonseed oil or other lauric or non-lauric fats and oils used as source of long-chain acyl groups are substituted wholly or in part by interesterified blends, e.g. interesterified blends of lauric and non-lauric fats and oils such as palm kernel oil and palm oil, for example in 40-75:60-25 weight proportions, e.g. 60:40. Such a blend can be combined by mixing with, for example, 25-50-75% (of the final fat composition) of diacylated long-chain monoglyceride, e.g. diacetyl $C_{16/18}$ monoglyceride, or by interesterification with a short-chain triglyceride, e.g. triacetin. (Clearly, a single interesterification step will suffice in the latter case.)

Particularly good results have been noted in terms of lack of brittleness where the final composition contains an appreciable portion of a eutectic formed between long-chain triglyceride and a di-(short-chain acyl) mono-(long-chain acyl) glyceride, as is the case with blends of palm kernel oil (25-75%) and diacetyl mono $C_{16/18}$ acyl glyceride (75-25%) and their equivalents.

Further useful fats comprise or consist substantially of a selectively or unselectively hardened edible oil or fat. In particular embodiments the hardened edible oil or fat can be, for example (e.g. selectively) hardened butter fat or butter oil (or butterfat stearin), or an (e.g. selectively) hardened edible non-lauric oil.

The term "non-lauric fat or oil" means an edible oil in which the principal fatty acyl content is not lauric acid, and for example in which there is a substantial amount of $C_{16}$ and/or $C_{18}$ unsaturated acyl groups, e.g. oleic, linoleic and/or linolenic acyl groups: the remaining bulk of the acyl groups is largely saturated, (e.g. $C_{16}$ and/or $C_{18}$ acids). Examples of such non-lauric oils are cottonseed oil, peanut oil, soyabean oil, sesame oil, safflower oil and sunflower oil, and particularly rapeseed oil (e.g. low-erucic rapeseed oil) and soyabean oil, and also palm oil.

Particularly suitable for the purposes of the invention are (e.g. low-erucic) rapeseed oil, groundnut or soyabean oil.

By selective hardening we mean exposure of the fat material to be treated to a catalyst which brings about isomerisation of the ethylenic bonds without substantial hydrogenation: considerable geometrical isomerisation (cis trans) occurs. A suitable known catalyst for the purpose is a poisoned nickel catalyst (a fresh nickel catalyst gives much hydrogenation (unselective hardening) but little of the isomerisation required in selective hardening).

The selective (or unselective) hardening can be carried out to the point at which the fat has a convenient slip melting point, e.g. 27°-34° C., though higher and lower melting points may be usable in some circumstances, e.g. 24°-42° C., 25°-40° C. The hardened oil or fat can form 100% of the fat of the confection, for example, or if desired somewhat less, e.g. 80-90% or 95%, if desired.

It is found that such fat coatings and zones for frozen confections can give good pliability and impermeability to moisture at low temperatures, thus enabling the production of frozen confections including baked or crisp components with desirably long shelf-lives at low temperatures.

The confectionery coating compositions can for example be made up with a fat content of 30-70% by weight, e.g. about 45% fat, 35-45% sugar, and 12-16% cocoa powder (e.g. 10/12% fat content cocoa powder). The presence of other fats besides those specified above is not excluded. Optional further additives include for example milk solids, emulsifiers and flavourants.

In the production processes according to the invention the fat coatings and zones can conveniently be applied by spraying, e.g. from an atomising spary gun. Illustrative embodiments of the products and processes of the invention are given below by way of exmple only.

EXAMPLE 7

A confectionery coating composition was made up using the following constituents:
Hardened butterfat: 45%,
Cocoa powder (10/12): 16.3%,
Sugar: 38.7%,
Flavouring: trace.

The hardened butter fat for the composition had been made as follows:

Butterfat was neutralised with 10% of 0.2N caustic soda, washed free of soap and bleached with 0.3% Tonsil Standard FF and 0.2% of filter aid at 105° C.

The resulting oil was hardeneed at 180° C. with 0.23% nickle as GK/s catalyst (sulphur-poisoned nickel), at 3 bar hydrogen pressure for about one hour, until a slip melting point increase of 1° C. had been achieved. (The process may be followed by measurement of refractive index, when the ND$\gamma$ changed by about 0.001 during the course of the reaction).

Post-refining was performed with a 10% 0.1N caustic soda wash until the product was soap-free, bleaching as in the pretreatment, and finally a deodorisation for five hours at 180° C. 0.1% fresh lecithin was added as antioxidant. The product had slip melting point 33°-34° C.

Confectionery wafer containers were passed along a coneyor of an apparatus having sequential coating and filling stations.

At the coating station, each container had a 0.5 mm thick layer of chocolate-flavoured fatty coating composition as prepared above applied to its internal surfaces from a downwardly-directed atomising spray gun (from Devilbiss Limited) arranged to deliver a spray of the molten coating (held prior to spraying at 43° C.) into the open top of the container.

After application of the coating, each container was shifted to a filling station where a dose of ice-cream or non-dairy ice confection mix at $-4°$ C. to $-5°$ C. was dosed into the coated container. Finally the composite confection was further frozen and hardend at $-26°$ C. for 30-45 minutes. Its further treatment, additional decoration or further wrapping was conventional and forms no part of this invention. It was found that the product of this Example could be stored for a satisfactorily long time without unacceptable moistening of the wafer by water from the ice-cream or non-dairy ice.

EXAMPLES 8-10

Example 7 was repeated except for the composition of the fatty confectionery coating. For the coating composition in each Example, the following edible oils were selectively hardened in a similar way to that described above, and to the following slip melting points:

Example 8 groundnut oil —s.m.p. 27° C.,
Example 9 soyabean oil —s.m.p. 39° C.,
Example 10 low-erucic rapeseed oil —s.m.p. 31° C.

The resulting hardened oils were incorporated and treated in an otherwise similar way to Example 7, and the resulting confections had good storage life together with satisfactory textural and flavour characteristics on consumption.

I claim:

1. A composite frozen confection comprising an ice confection in contact with a layer of fat-based confectionery composition comprising a suspension of sweetening and flavoring solids in an edible fat, wherein the edible fat includes a fat composition which is an interesterified mixture of about 75% to 90% of a lauric acid or oil and about 10% to 25% of a non-lauric oil having
   (a) solids content index (SCI) values (%) in each of the following ranges:
   70-93 at $-20°$ C.;
   65-93 at $-10°$ C.;
   55-90 at 0° C.;
   15-40 at 20° C.;
   0-12 at 30° C.; and
   0 at 35° C.;
   (b) slip melting point in the range 23°-32° C., and
   (c) a brittleness time of at least 45 seconds.

2. A composite frozen confection according to claim 1, characterised in that the fat composition has viscosities (when measured at 36° C.) $\eta_{100}$ not more than 2.5 poise, and $\eta_{C4}$ not more than 2.0 poise.

3. A composite frozen confection according to claim 1, characterised in that the non-lauric oil (b) is selectively hardended rapeseed oil, preferably in the range 25-15% by weight.

4. A composite frozen confection according to claim 1, wherein the interesterified mixture contains mixtures selected from the group consisting of about 82.5% palm kernel oil plus about 17.5% selectively hardened rapeseed oil; about 82.5% coconut oil plus about 17.5% selectively hardened rapeseed oil and about 60% palm kernel oil plus about 40% selectively hardened low-erucic rapeseed oil.

5. A composite frozen confection comprising an ice confection in contact with a layer of fat-based confectionery composition comprising a suspension of sweetening and flavoring solids in an edible fat, wherein the edible fat includes a fat composition which essentially consists of triglycerides in which less than $\frac{2}{3}$ by number of the acyl groups are short-chain (C<6) acyl groups and more than $\frac{1}{3}$ by number of the acyl groups are long chain (C>12 acyl groups, substantially randomly distributed amongst the triglycerides having
   (a) solids content index (SCI) values (%) in each of the following ranges:
   70-93 at $-20°$ C.;
   65-93 at $-10°$ C.;
   55-40 at 0° C.;
   15-40 at 20° C.;
   0-12 at 30° C.; and,
   0 at 35° C.;
   (b) slip melting point in the range 23°-32° C., and
   (c) a brittleness time of at least 45 seconds.

6. A composite frozen confection according to claim 5, characterised in that the fat composition is selected from (a) blends of 25-75% lauric or non-lauric fat or oil with 75%-25% short-chain diacylated long chain monoglyceride, and (b) interesterified blends of lauric or non-lauric fat or oil with up to about 10% short chain triglyceride.

7. A composite frozen confection according to claim 6, wherein the short-chain diacylated long chain monoglyceride is about 50% diacetylated $C_{16/18}$ monoglyceride.

8. A composite frozen confection according to claim 5, wherein the triglycerides are selected from the group consisting of triacetin and butterfat.

9. A composite frozen confection comprising an ice confection in contact with a layer of bat-based confectionery composition comprising a suspension of sweetening and flavoring solids in an edible fat, wherein the edible fat includes a fat composition which essentially comprises a selectively hardened fat composition selected from the group consisting of low-erucic rapeseed oil, groundnut, soyabean oil, cottonseed oil and sunflower oil having
   (a) solids content index (SCI) values (%) in each of the following ranges:
   70-93 at $-20°$ C.;
   65-93 at $-10°$ C.;
   55-90 at 0° C.;
   15-40 at 20° C.;
   0-12 at 30° C.; and
   0 at 35° C.;
   (b) slip melting point in the range 23°-32° C., and
   (c) a brittleness time of at least 45 seconds.

* * * * *

UNITED STATES PATENT AND TRADEMARK OFFICE
CERTIFICATE OF CORRECTION

PATENT NO. : 4,430,350    Page 1 of 3

DATED : February 7, 1984

INVENTOR(S) : David Tresser

It is certified that error appears in the above-identified patent and that said Letters Patent is hereby corrected as shown below:

First page, 2nd column, 2nd line, "1459659" should read --1,459,649--;

Col. 1, line 19, "cosumption" should read --consumption--;

Col. 2, line 10, "<10" should read -->10--;

Col. 2, line 13, "(c)" should appear at the beginning of the following line;

Col. 2, line 47, "be" should read --by--;

Col. 3, line 6, "interosterification" should read --interesterification--;

UNITED STATES PATENT AND TRADEMARK OFFICE
CERTIFICATE OF CORRECTION

PATENT NO. : 4,430,350
DATED : February 7, 1984
INVENTOR(S) : David Tresser

It is certified that error appears in the above-identified patent and that said Letters Patent is hereby corrected as shown below:

Col. 3, line 19, "indentical" should read --identical--;

Col. 3, line 60, "mixture" should read --mixtures--;

Col. 4, line 39, after "oils" insert --are--;

Col. 5, line 26, change "12,9%" to --12.9%,--;

Col. 5, line 27, change "1.7%." to --1.7%, lecithin 0.5%.--;

Col. 5, line 33, "µm (by Sheen gauge)" should not be italicized;

Col. 6, lines 53-54, "Rotodisko" should read --Rotovisko--;

UNITED STATES PATENT AND TRADEMARK OFFICE
CERTIFICATE OF CORRECTION

PATENT NO. : 4,430,350　　　　　　　　Page 3 of 3

DATED : February 7, 1984

INVENTOR(S) : David Tresser

It is certified that error appears in the above-identified patent and that said Letters Patent is hereby corrected as shown below:

Col. 7, line 57, "tiem" should read --time--;

Col. 11, line 36, "other" should read --others--;

Col. 12, line 19, "(cis　trans)" should read --(cis $\longleftrightarrow$ trans)--;

Col. 12, line 47, "spary" should read --spray--;

Col. 13, line 1, "ND$\gamma$changed" should read --ND$^{65}$changed--;

Signed and Sealed this

Tenth Day of July 1984

[SEAL]

Attest:

GERALD J. MOSSINGHOFF

Attesting Officer　　　　Commissioner of Patents and Trademarks